United States Patent [19]

Waaske

[11] 3,967,290

[45] June 29, 1976

[54] MINIATURE MIRROR REFLEX CAMERA

[75] Inventor: Heinz Waaske, Mascherode, Germany

[73] Assignee: Rollei-Werke Franke & Heidecke, Braunschweig, Germany

[22] Filed: Oct. 2, 1974

[21] Appl. No.: 511,191

[30] Foreign Application Priority Data

Oct. 5, 1973 Germany .......................... 2350438

[52] U.S. Cl. .............................. 354/154; 354/152; 354/224; 354/249

[51] Int. Cl.$^{2}$ .................... G03B 19/12; G03B 15/00

[58] Field of Search ........... 354/152, 156, 150, 154, 354/155, 202, 204, 205, 206, 207, 219, 224, 225, 245, 247, 248, 249

[56] References Cited

UNITED STATES PATENTS

| | | | |
|---|---|---|---|
| 2,234,345 | 3/1941 | Hershberg | 354/156 |
| 3,008,397 | 11/1961 | Winkler | 354/156 |
| 3,785,270 | 1/1974 | Schiff | 354/156 |

*Primary Examiner*—Russell E. Adams, Jr.
*Attorney, Agent, or Firm*—Stonebraker, Shepard & Stephens

[57] ABSTRACT

A miniature mirror reflex camera having a camera body carrying an objective lens at the front, and having at the rear means for holding a conventional film cassette of a known type made for miniature cameras. Arranged between the lens and the cassette is a sliding carrier movable in a direction perpendicular to the optical axis of the lens and at right angles to the direction of the travel of the film in the cassette. A reflex mirror is mounted in fixed position on this carrier, and below the mirror is a shutter. When the carrier is slid downwardly to a lower position, the reflex mirror intersects the optical axis and deflects the light rays coming in through the lens, upwardly to a viewing screen which is seen through an eyepiece and a pentaprism. In this position, the carrier effectively blocks passage of light rays rearwardly toward the film in the cassette. When the slidable carrier is moved upwardly toward the viewing screen, the shutter mounted on the slidable carrier is brought into alignment with the optical axis, and the opening of the shutter allows light to pass rearwardly from the lens through the open shutter to the film in the cassette, to make an exposure.

2 Claims, 3 Drawing Figures

1 2 3 4 5 6 7 14 15a 15 17 A A 13 B B 14 15a 8 8a 9 10 11 12

MINIATURE MIRROR REFLEX CAMERA

BACKGROUND OF THE INVENTION

The invention relates to mirror reflex cameras of the single lens type, where the finder image is formed by light coming through the same lens through which light reaches the sensitized film when an exposure is made. Such cameras are well known in the art. In most such cameras, the reflex mirror is pivoted to tilt or swing from viewing position to picture-taking position and vice versa. This is the common practice in single lens mirror reflex cameras designed to take film of the conventional 35 millimeter width. It is difficult, however, to find adequate room for the swinging mirror and other parts necessarily associated therewith, if it is desired to produce a truly miniature camera, taking film with considerably less width than 35 millimeters.

SUMMARY OF THE INVENTION

The present invention deals with a miniature camera intended for use with a conventional film cassette of the size known as 110 to take a picture with exposure size of substantially 13 × 17 millimeters. The back of the camera housing or casing of the present invention is of appropriate size and shape to receive such film cassette, while the front of the housing carries the lens or objective, which may be either permanently mounted on the camera or interchangeable. Within the camera body is a guideway or shaft extending in a direction perpendicular to the optical axis of the lens, and parallel to the film plane but in a direction at right angles or perpendicular to the direction of advancing movement of the film in the cassette. In this shaft there is a slidable carrier member, movable upwardly in the shaft, between an upper position and a lower position. At the top of the shaft is a viewing screen or viewfinder screen, the image on which is viewed preferably through an eyepiece and pentaprism.

The slidable carrier member carries the reflex mirror mounted in fixed position on the carrier, and a shutter of the "central" type mounted on the carrier at an elevation below the lower edge of the reflex mirror. When the carrier is in its lower position, the center of the reflex mirror lies on the optical axis of the lens, the mirror intersecting the optical axis at an angle of approximately 45 degrees thereto, and is so positioned that the light beam coming in through the lens is reflected upwardly onto the viewing screen at the top of the vertical shaft in which the carrier slides. The carrier is so shaped that in this position, it completely obstructs passage of light to the film gate or exposure aperture. When the carrier member is moved upwardly in the shaft, toward the viewing screen, to its upper position, then the shutter mounted on an movable bodily with the carrier is brought up into axial alignment with the optical axis. The carrier is so shaped that when it is in this position, nothing except the shutter obstructs passage of light from the lens along the optical axis to the film gate or exposure aperture, so that when the shutter is opened, light may reach the film to make an exposure.

DESCRIPTION OF THE PREFERRED EMBODIMENT

Figure 3:
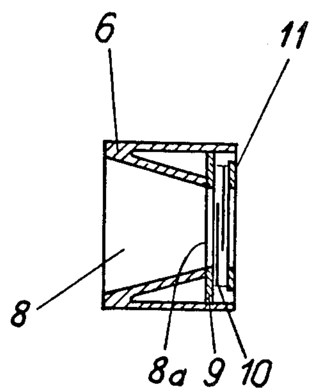
FIG. 3 is a horizontal section through the slidable carrier removed from the camera, approximately on the line B—B of FIG. 1.

Referring now to the drawings, the camera body or housing is indicated at 1. In the upper part of the body is a pentaprism 2 of conventional construction, viewed through a conventional eyepiece 3, enabling the person viewing the camera to see the image on the viewing screen 4 arranged horizontally immediately below the pentaprism 2. The screen 4 is of conventional construction, ground glass or equivalent. Terms of position or direction such as above, below, forward, rear vertical, and horizontal are used merely for convenience of description, with reference to the camera as normally held in front of a person, for taking a picture in an approximately horizontal direction. Naturally, the camera could be held in any desired position of orientation.

Beneath the viewing screen 4 the camera body contains a vertical shaft 5 which constitutes a guideway for an upwardly and downwardly slidable carrier or carriage 6. A reflex mirror 7 is mounted in a fixed position on the carrier or support 6. Below the mirror 7, the carrier 6 contains a horizontal light passage or shaft 8 extending in a direction parallel to the optical axis, and at the front of this light shaft 8 there is a carrier plate 9 of a shutter of the "central" type, having shutter blades 10 of conventional kind, mounted pivotally or otherwise movably on the carrier plate 9, the blades being actuated by a conventional shutter blade driving ring 11. The shutter controls passage of light through the aperture 8a at the front end of the light passage shaft 8.

Figure 1:
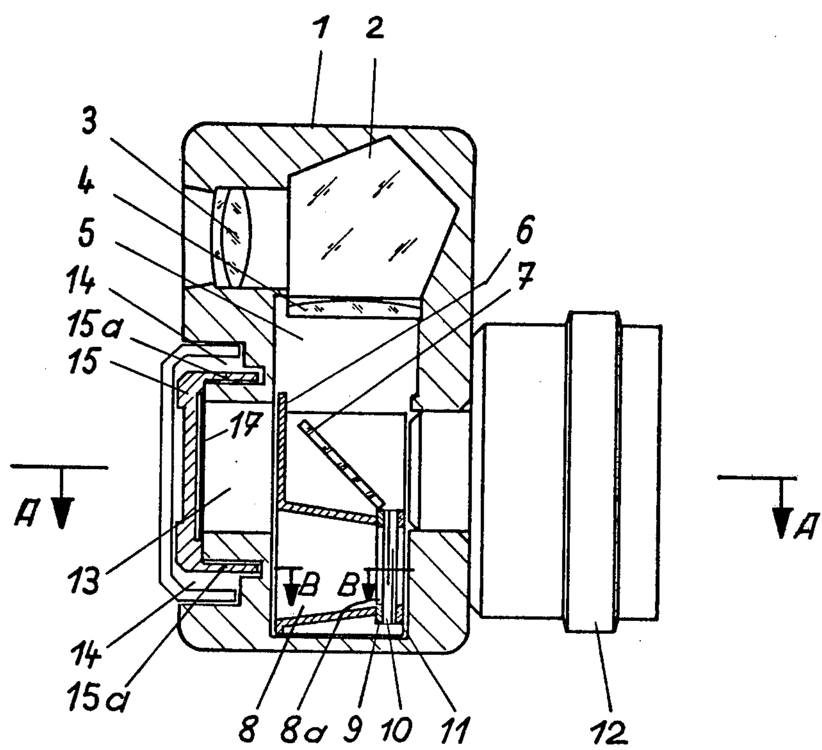
FIG. 1 is a somewhat diagrammatic or schematic longitudinal section taken vertically through a camera in accordance with a preferred embodiment of the present invention.
Figure 2:
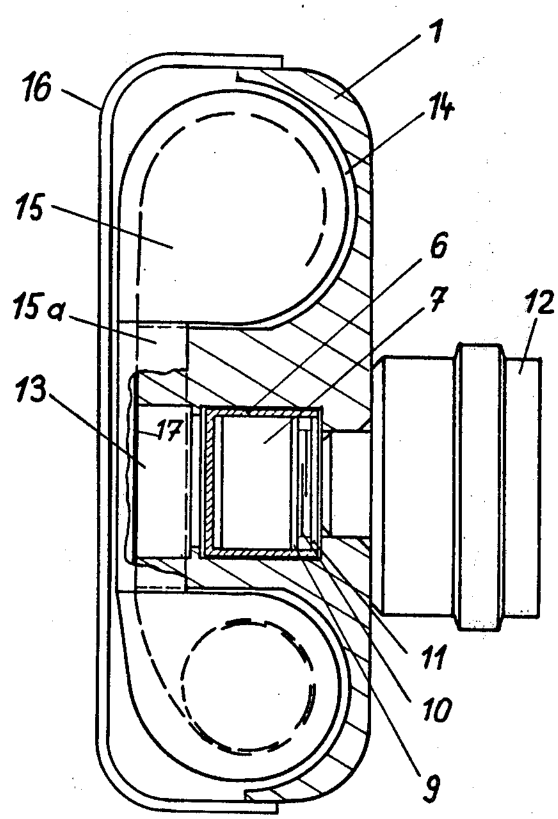
FIG. 2 is a similar horizontal section, taken approximately on the line A—A of FIG. 1.

Mounted on the front of the camera body is a lens or objective 12 of conventional kind. It may be mounted on the camera body either permanently or interchangeably. This lens defines the optical axis of the camera, extending horizontally when the camera is held in normal picture taking position. At the rear of the camera, behind the vertical light passage shaft 5, is an image gate or exposure aperture 13, and on either side of this image gate (that is, at right and left thereof in a horizontal direction, see FIG. 2) there are recesses 14 to receive the enlarged film holding parts of a conventional film cassette 15 commercially available on the market, intended for miniature cameras. A conventional commercial cassette of this kind has strengthening webs or flanges **15*a* which connect the film holding rounded enlarged parts at opposite ends of the cassette with each other, and these flanges 15*a* are quite wide in a horizontal direction, extending forwardly from the film plane, as seen in FIG. 1, in order to give the necessary structural strength to the cassette. The camera is provided with a rear panel or cover plate 16 which covers and protects the cassette 15. The portion of the film in the focal plane, behind the image gate or exposure aperture 13, is indicated at 17.**

The parts are so dimensioned that when the carrier 6 is in its lowest position, at the bottom of the vertical light shaft 5, the center the mirror 7 is in alignment with the optical axis. This is the position illustrated in FIG. 1. The mirror lies at an angle of 45° to the optical axis. Light entering through the lens 12 is reflected by the mirror upwardly onto the viewing screen 4, to form a finder image thereon. This image can be viewed by the user of the camera, through the eyepiece 3 and pentaprism 2. The shape of the carrier 6 is such that when the carrier is in this lower position, it completely blocks access of light to the film gate or image aperture 13, so that no stray light can fall on the film 17 and no fogging can take place.

When the user is satisfied with the composition of the picture image as seen on the viewing screen, he presses the conventional camera release member (not shown, and usually in the form of a depressible rod or plunger) and this motion, through any conventional kind of mechanical linkage or transmission (also not shown) raises the entire carrier 6, sliding it upwardly in the vertical light passage shaft 5 which constitutes the guideway for the sliding carrier. In the upper position of the carrier, the mirror 7 is up close to the viewing screen or focusing screen 4, and the horizontal light shaft or passageway 8 and its associated shutter 10 are now centered on the optical axis. A further depression of the release plunger operates the shutter 10 in the conventional manner, turning the blade ring 11 to open the shutter blades, and then to close them after a suitable brief interval, so that while the blades are open, light entering through the lens 12 and through the open shutter blades 10 passes horizontally through the light transmission shaft 8 and into the exposure aperture or film gate 13, falling upon the film 17 to make the desired exposure.

When the finger of the user is taken off of the release plunger so that the plunger is restored to its rest position by suitable conventional springs, the sliding carriage or support 6 moves downwardly again in its vertical passageway or shaft 5, to the lower position illustrated in FIG. 1, where the mirror 7 is once more centered on the optical axis, and passage of light to the film is completely prevented in this position of the slidable carrier 6.

It may be noted that the direction of movement of the carrier 6 (vertically upwardly and downwardly) is perpendicular to the direction of the optical axis. It may also be noted that the transport or advancing feedng movement of the film past the film gate is in a horizontal direction perpendicular to the optical axis. Since the movement of the sliding carrier 6 is vertical and perpendicular to the optical axis, it is seen that the movement of the sliding carrier is at right angle or perpendicular to the direction of feeding movement of the film.

The shutter 10, 11 has been referred to above as a shutter of the "center" type. This type of shutter, well known in the art, is often referred to also as a lens shutter or an objective shutter, and is to be distinguished from what is called a slit shutter or focal plane shutter, located just in front of the focal plane or film plane.

Attempts have been made to use a slidable carrier for the mirror, in miniature cameras equipped with a slit shutter or focal plane shutter, but a practical construction is not possible if conventional film cassettes, available on the market, are to be used. The wide strengthening webs or flanges 15*a* of such commerically available cassettes interfere with the operation of a focal plane shutter, so that such a shutter cannot be used unless special cassettes are employed, and this is not feasible. If it is attempted to use a central shutter or lens shutter, mounted in the conventional way in a permanent or fixed position on the camera body, this also is not feasible because the shutter, even when open, is likely to interfer with the passage of the light rays to the focusing screen, in a camera of this miniature size, as distinguished from a full size camera taking pictures on 35 millimeter film. Moreover, if a central shutter were mounted in fixed position on the camera body, mechanism would have to be provided for opening the shutter for viewfinding purposes and then closing it again before the mirror is shifted from viewing position to picturetaking position. Of course this is commonly done in a single lens mirror reflex camera of full size, but in a miniature camera of the size with which this invention deals, it is very difficult to find the necessary space for the mechanism that would be required.

These difficulties are solved, according to the present invention, by using a central shutter as distinguished from a slit or focal plane shutter, and by mounting this central shutter on the sliding carrier on which the reflex mirror is mounted, instead of mounting the shutter in permanent fixed position on the camera body. Because the shutter is not located at the optical axis during the viewing procedure, it does not have to be opened for viewing, and does not interfere in any way with passage of the full bundle of rays to the viewing or focusing screen. When the exposure is to be made, the shutter is brought into proper position in the optical axis, and then performs it function in the usual way.

With this arrangement it is possible to provide a miniature camera with very small dimensions, adapted to use conventional film cassettes readily available on the market, such as the size 110 cassette making exposures 13 × 17 millimeters. As above mentioned, the lens 12 can be detachably mounted on the camera so that it may be interchanged with a different lens of different focal length. Thus a very versatile camera is provided, which at the same time is extremely compact, light in weight, comparatively easy and inexpensive to manufacture, and which uses conventional film cassettes readily available on the commercial market.

What is claimed is:

1. A reflex camera including lens means establishing an optical axis, said camera being adapted to contain a conventional miniature film cassette of the type having enlarged rounded film-containing portions at both ends of the cassette and a straight portion between the enlarged rounded portions and flanges extending longitudinally along the lateral edges of said straight portion and projecting therefrom in a forward direction perpendicularly to film in said straight portion, film being advanced through said straight portion in a direction perpendicular to said optical axis, said camera also including means forming an image gate aligned with said optical axis and lying in front of film in said straight portion of said cassette, said camera further comprising:

a. a slidable carriage shiftable back and forth between two limit positions, said carriage having a light deviating device aligned with said optical axis when said carriage is in a first one of its said limit positions and having a light passage shaft aligned with said optical axis and with said image gate when said carriage is in the second one of its said limit positions;

b. means guiding said slidable carriage for movement from one limit position to the other limit position in a direction substantially perpendicular to said optical axis and also substantially perpendicular to said direction in which the film is advanced and through said straight portion of said cassette;

c. a central shutter permanently mounted in said light passage shaft of said slidable carriage and movable bodily with said carriage; and d. means on said carriage blocking passage of light along said optical axis to said image gate except only through said light passage shaft.

2. A reflex camera including lens means establishing an optical axis, said camera being adapted to contain a conventional miniature film cassette of the type having film-containing portions at both ends of the cassette and a straight portion between the film-containing portions, film being advanced through said straight portion in a direction perpendicular to said optical axis, said camera also including means forming an image gate aligned with said optical axis and lying in front of film in said straight portion of said cassette, said camera further comprising:

a. a slidable carriage shiftable back and forth between two limit positions, said carriage having a light deviating device aligned with said optical axis when said carriage is in a first one of its said limit positions and having a light passage shaft aligned with said optical axis and with said image gate when said carriage is in the second one of its said limit positions;

b. means guiding said slidable carriage for movement from one limit position to the other limit position in a direction substantially perpendicular to said optical axis and also substantially perpendicular to said direction in which the film is advanced and through said straight portion of said cassette;

c. a central shutter permanently mounted in said light passage shaft of said slidable carriage and movable bodily with said carriage; and d. means on said carriage blocking passage of light along said optical axis to said image gate except only through said light passage shaft.

* * * * *